US006939387B2

(12) United States Patent     (10) Patent No.:    US 6,939,387 B2
Elizer                                    (45) Date of Patent:      Sep. 6, 2005

(54) SOIL ENHANCERS

(75) Inventor: Mark Elizer, Wellington, FL (US)

(73) Assignee: Calcuim Silicate Corporation, Inc., Lake Harbor, FL (US)

( * ) Notice: Subject to any disclaimer, the term of this patent is extended or adjusted under 35 U.S.C. 154(b) by 322 days.

(21) Appl. No.: 10/223,388

(22) Filed: Aug. 19, 2002

(65) Prior Publication Data

US 2004/0031304 A1 Feb. 19, 2004

(51) Int. Cl.$^7$ ............................. C05D 3/00; C05D 5/00
(52) U.S. Cl. ............................. 71/31; 71/61; 71/64.03; 71/62
(58) Field of Search .......................... 71/31, 61, 64.03, 71/62

(56) References Cited

U.S. PATENT DOCUMENTS

| | | | | |
|---|---|---|---|---|
| 4,015,973 A | * | 4/1977 | Perrine ........................... | 71/63 |
| 5,743,934 A | | 4/1998 | Wommack et al. ............ | 71/28 |
| 5,997,599 A | | 12/1999 | Wommack et al. ............ | 71/11 |
| 6,287,356 B1 | | 9/2001 | Wommack et al. ............ | 71/28 |
| 6,325,836 B1 | | 12/2001 | Wommack et al. ............ | 71/15 |

FOREIGN PATENT DOCUMENTS

| | | | |
|---|---|---|---|
| CN | 243534 | * | 6/1986 |
| CN | 273828 | * | 4/1991 |

OTHER PUBLICATIONS

"Soil Acidity and Liming", Internet Inservice Training, http://hubcap.clemson.edu/~blpprt/acid5.html., Nov. 27, 2001, pp. 1–8.*
Voisin ("Grass Tetany", Chap. 7, http;//www.soilandhealth.org/01aglibrary/010106 voisin/010106 gtchap7.html., Feb. 20, 2001, pp. 1–6.*
Mutinsky et al. (Agrochemie (Bratislava), 26(6), pp. 169–172, 1986.*
Anderson, et al., "Multi–year response of sucarcane to calcium silicate slag on Everglades histosois," *Agronomy J.* 83:000–000 (1991).
Anderson et al., "Response of a rice–sugarcane rotation to calciumsilicate slag on everglades histosols," *Agronomy J.* 79: 531–535 (1987).
Barbosa–Filho, et al., "Evaluation of soil test procedures for determining rice–available silicon," *Commun. Soil Sci. Plant Anal.* 32(11–12): 1779–179 (2001).

Datnoff, et al., "Influence of lime, calcium silicate slag and fungicides on brown spot development in rice," pp. 22–28.
Gascho, "Response of sugarcane to calcium silicate slag. I. Mechanisms of respone in Florida," *Proc. Soil & Crop Science Society of Florida* 37: 55–58 (1977).
Gascho, "Silicon status of Florida sugarcane," *Proc. Soil & Crop Science Society of Florida* 36: 188–191 (1976).
Menzies, et al., "Effects of soluble silicon on the parasitic fitness of *Sphaerotheca fuliginea* on *Cucumis sativus*," *Phytopathology* 81:84–88 (1991).
Plucknett, "The use of soluble silicates in Hawaiian agriculture," *Australian Society of Soil Science, queensland* (May 1968).
Rozeff, "Cane Planter," *Sugar J.* pp. 20 (Jan 1992).
Savant, et al., "Silicon management and sustainable rice production," *Adv. Agronomy* 58: 151–199 (1997).
Seebold, et al., "Effect of silicon rate and host resistance on blast, scald, and yield of upland rice," *Plant Disease* 84: 871–876 (2000).
Seebold, et al., "The influence of silicon on components of resistance to blast in susceptible, partially resistant, and resistant cultivars of rice," *Phytopathology* 91(1): 63–69 (2001).

* cited by examiner

*Primary Examiner*—C. Sayala
(74) *Attorney, Agent, or Firm*—Holland & Knight LLP; Donald S. Showalter; Todd Hofmeister (57) ABSTRACT

Compositions for increasing the amount of available silica, calcium, magnesium, and sulfur are described herein. The compositions contain calcium silicate ($CaSiO_2$) and magnesium sulfite ($MgSO_3$). Calcium silicate may be in the form of calcium silicate slag. Magnesium sulfite may be a by-product obtained from power plants. In one embodiment, the composition is in granular form and contains 65–90% (wt) calcium silicate slag, 20–30% (wt) magnesium sulfite, 0–5% (wt) expandible clay, and 2–10% (wt) residual moisture ($H_2O$). In a preferred embodiment, the granules contain 31% (wt) silica, 22% (wt) calcium, 3% (wt) magnesium, and 4% (wt) sulfur. In a second embodiment, the composition is non granular and contains 75–90% (wt) calcium silicate slag, 10–20% (wt) magnesium sulfite and 0–10% (wt) $H_2O$. The compositions may be applied to golf courses or residential or commercial lawns to improve the growth of grasses and their resistance to disease and insects. Alternatively, the compositions may be applied for use in agriculture for monocots, including grasses, sugarcane, cucumbers, rice, oats, corn, wheat, and barley, and dicots, such as citrus plants, cucumbers and tomatoes.

13 Claims, 3 Drawing Sheets

Tygon tubing
1 ml./min.

FIG. 3B

SOIL ENHANCERS

FIELD OF THE INVENTION

The present invention is in the field of fertilizers.

BACKGROUND OF THE INVENTION

For some plants species, silicon (Si) is absorbed from the soil in large amounts, which are greater than those of essential macronutrients, such as potassium, nitrogen and phosphorus. Silicon benefits plants by increasing their yields. It improves the physical properties of soil and the resistance of plants to disease and pests and increases the tolerance of plants to toxic elements, such as iron and manganese.

Much of the soil is comprised of silicon in different forms. For example, 40–70% of the clay soils contain silica ($SiO_2$), while 90–98% of the sandy soils contain silica. Additionally, silicon may be in the form of a silicate, a salt or ester derived from silicic acid. However, silicate is not in a form of silicon that can be delivered to plants. Plants assimilate silicon as monosilicic acids ($H_4SiO_4$). Plants can adsorb from 70 to 700 kg of silicon/ha of soil. Plants transform much of the silicon into epidemical tissue.

Silicon has been shown to be vital in the growth of rice and sugarcane. Silicon is necessary for healthy and productive development of the rice plant. It reduces the severity of diseases in rice such as blast, brown spot, sheath blight, stem rot, and leaf scald. Seebold et al., *Plant Disease,* 871–76 (August 2000). Rice absorbs large amounts of silicon from the soil. For example a rice crop that produces a total grain yield of 5 tons/ha typically removes from 230–470 kg Si/ha (500–1000 kg $SiO_2$/ha) from the soil. Thus even in soils that are initially able to provide sufficient silicon to the rice plants, as time passes the rice depletes the amount of silicon in the soil and supplemental silicon sources are needed.

Sugarcane is another agricultural product which requires a lot of silicon. Silicon prevents freckling in sugarcane. G. J. Gascho, *Soil & Crop Soc'y Fla. Proc.,* 36: 188–191 (November 1976) Silicon is present in considerable quantities in the sugarcane plant. Silicon absorption is particularly high in the green leaves during the first six months of growth, after which it remains fairly constant. N. Rozeff, *Sugar J.,* p. 20 (January 1992)

Many soils, including sandy flatwood soils, contain low levels of available silica and are very acidic. As plants assimilate the available silica from the soil into their tissue, the amount of available silica is depleted. The silicon deficiency in the soil has lead farmers to use different materials to increase the levels of available silicon in the soil.

Lime (CaO) is often added to acidic soil acidic to ensure that the soil is at the proper pH to allow for efficient uptake of nutrients, such as phosphorus, potassium, and nitrogen, and to prevent the delivery of toxic levels of substances, such as manganese and aluminum.

Reclime® contains calcium (26–28%), magnesium (6–8%), calcium carbonate equivalent (90–100%), soluble silicon (>10 lbs/ton). It is designed to provide soluble silicon and control the pH of the soil, like lime. Reclime® contains $MgSiO_3$, which is very soluble in water. Therefore, the silicon from $MgSiO_3$ is delivered quickly to the plant. However, Reclime® also contains aluminum and iron, which bind with the silica and reduce the amount of available silica. Thus, Reclime® is unable to provide sufficient silicon to the plants for a sustained period of time without frequent applications.

U.S. Pat. Nos. 5,743,934 and 5,997,599 to Wommack et al. disclose water disintegratable pellets formed from cement kiln dust and a water soluble binder. Additionally primary plant nutrients, secondary plant nutrients (magnesium, sulfur, and/or calcium), and or micronutrients (iron, copper, etc) may be present in the pellets. At least 15% of the resulting pellet is from a calcium source, such as kiln dust, lime, limestone, or gypsum. This results in a pellet with a small amount of silica. The small quantity of silica in the pellet does not provide enough silica for efficient uptake of nutrients by plants. Thus, large amounts of the pellets must be applied to the soil to provide a sufficient amount of silica for the plants.

Dolomite, formed of calcium magnesium carbonate ($CaMg(CO_3)_2$), is used in agriculture, residential or commercial lawns and golf courses. It is applied to lawns to increase the pH of the soil, while delivering the nutrients, calcium and magnesium, to the soil. However, Dolomite does not provide any silica to the soil. Thus a separate silica source must be administered in addition to Dolomite, which increases the cost of the treatment for the soil.

Calcium silicate ($CaSiO_2$) (CS) slag is obtained as a bi-product from the mining of metals. It has been used for agricultural purposes to deliver silicon to plants. In mild acidic conditions, silicon becomes soluble so that it can travel through the soil to the roots of the plants. Studies have demonstrated that during the early growth stage for rice plants, the application of CS slag increases the soil's pH and calcium concentration. However, CS slag does not provide magnesium to the soil. Thus a separate source for magnesium must be added to the soil, thereby increasing the cost for the soil treatment.

It is therefore an object of the invention to provide a more cost-effective soil enhancer for use in agriculture, residential or commercial lawns and golf courses.

A further object of the invention is to provide a soil enhancer that delivers nutrients to plants for a prolonged period of time.

BRIEF SUMMARY OF THE INVENTION

Compositions for increasing the amount of available silica, calcium, magnesium, and sulfur are described herein. The compositions contain calcium silicate ($CaSiO_2$) and magnesium sulfite ($MgSO_3$). Calcium silicate may be in the form of calcium silicate slag. Magnesium sulfite may be a by-product obtained from power plants. In one embodiment, the composition is in granular form and contains 65–90% (wt) calcium silicate slag, 20–30% (wt) magnesium sulfite, 0–5% (wt) expandible clay, and 2–10% (wt) residual moisture ($H_2O$). In a preferred embodiment, the granules contain 31% (wt) silica, 22% (wt) calcium, 3% (wt) magnesium, and 4% (wt) sulfur. In a second embodiment, the composition is non granular and contains 75–90% (wt) calcium silicate slag, 10–20% (wt) magnesium sulfite and 0–10% (wt) $H_2O$. The compositions may be applied to golf courses or residential or commercial lawns to improve the growth of grasses and their resistance to disease and insects. Alternatively, the compositions may be applied for use in agriculture for monocots, including grasses, sugarcane, cucumbers, rice, oats, corn, wheat, and barley, and dicots, such as citrus plants, cucumbers and tomatoes.

BRIEF DESCRIPTION OF THE DRAWINGS

FIG. 3A depicts the entire process. FIG. 3B is a close-up view of the column.

DETAILED DESCRIPTION OF THE INVENTION

1. Compositions

Compositions for increasing the amount of available silica, calcium, and magnesium in soil for uptake by plants are described herein. The compositions are formed of calcium silicate slag and magnesium sulfite. The compositions may be granulated or non-granulated. Granulated means that the particles are in a size range of −6 mesh to 35 mesh. Non-granulated means that the particles are about the size of sand. Generally 95% of the non-granulated composition passes through −8 mesh.

a. Calcium Silicate

The composition contains calcium silicate ($CaSiO_2$) in an amount ranging from 75–90% (wt) for non-granulated compositions and 65–90% (wt) for granulated compositions. In the preferred embodiment, non-granulated compositions contain 80% (wt) $CaSiO_2$ and granulated compositions contain 70% (wt) $CaSiO_2$. One cost-efficient source for the calcium silicate is calcium silicate slag, a mining by-product. In the preferred embodiment, the calcium silicate slag does not contain high levels of metals which bind with silica, such as aluminum and iron. The aluminum and iron should be less than 10% (wt) of the CS slag. In the preferred embodiment, aluminum and silica comprise about 3% (wt) of the CS slag. Different slags have different chemical characteristics, which are a function of where the ores were mined and the processes that were used to produce them. For example, during the production of elemental phosphorus, calcium silicate slag is produced as a waste product. This CS slag contains 27–31% (wt) Ca, 41–44% (wt) $SiO_2$, 2–2.6% (wt) Al, 0.2–1% (wt) Fe. In the preferred embodiment, the CS slag contains 29.6% (wt) Ca, 43.4% (wt) $SiO_2$, 2.24% (wt) Al, and 0.20% (wt) Fe.

b. Magnesium Sulfite

The composition contains magnesium sulfite ($MgSO_3$) in an amount ranging from 10–20% (wt) for non-granulated compositions and 20–30% (wt) for granulated compositions. In the preferred embodiment, non-granulated compositions contain 16% (wt) $MgSO_3$ and granulated compositions contain 23% (wt) $MgSO_3$. In the preferred embodiment, magnesium sulfite is provided in the form of a magnesium sulfite by-product, which is obtained from power plants. The power plants are coal fire generating units. When the coal is burned, a flue gas, which contains sulfur dioxide, is produced. The flue gas is scrubbed with magnesium oxide, and magnesium sulfite is formed as a by-product. The magnesium sulfite by-product contains 51–54% (wt) magnesium sulfite, 24–27% (wt) magnesium sulfate, and 13–16% (wt) sulfur trioxide (complexed with $MgSO_3$ and $MgSO_4$).

c. Magnesium-Enhanced Calcium Silicate

Magnesium-enhanced calcium silicate (Mg CS) is formed from the mixture of magnesium sulfite and calcium silicate. The resulting Mg CS non-granulated composition contains approximately 30% (wt) silica ($SiO_2$), 20% (wt) calcium, 4.5% (wt) sulfur, 3% (wt) magnesium, 1.5% (wt) phosphoric acid ($P_2SO_4$), and 0.5% (wt) potash ($K_2O$). In a preferred embodiment, the non-granulated Mg CS contains 28% (wt) silica, 19% (wt) calcium, 6% (wt) sulfur, 3% (wt) magnesium, 1.5% (wt) phosphoric acid, and 0.5% (wt) potash. The non-granulated composition contains particles that are about the size of sand. Generally 95% of the non-granulated composition passes through −8 mesh.

Optionally, the Mg CS may be in a granulated form. The magnesium sulfite acts as a binder, thus no binder is needed. Optionally, an expandable clay, such as minu gel, is mixed with the calcium silicate and magnesium sulfite during the formation of the granules. The expandable clay helps the granules dissolve upon exposure to water. The average granule size ranges from −6 mesh to 35 mesh. For uses in agriculture or residential or commercial lawns, the average granule size ranges from −6 mesh to 12 mesh. For golf course applications, the average particle size is typically from −12 mesh to 35 mesh. Particles which are smaller than 35 mesh will not spread easily and could blow away.

2. Methods of Making Magnesium-Enhanced Calcium Silicate

Figure 1:
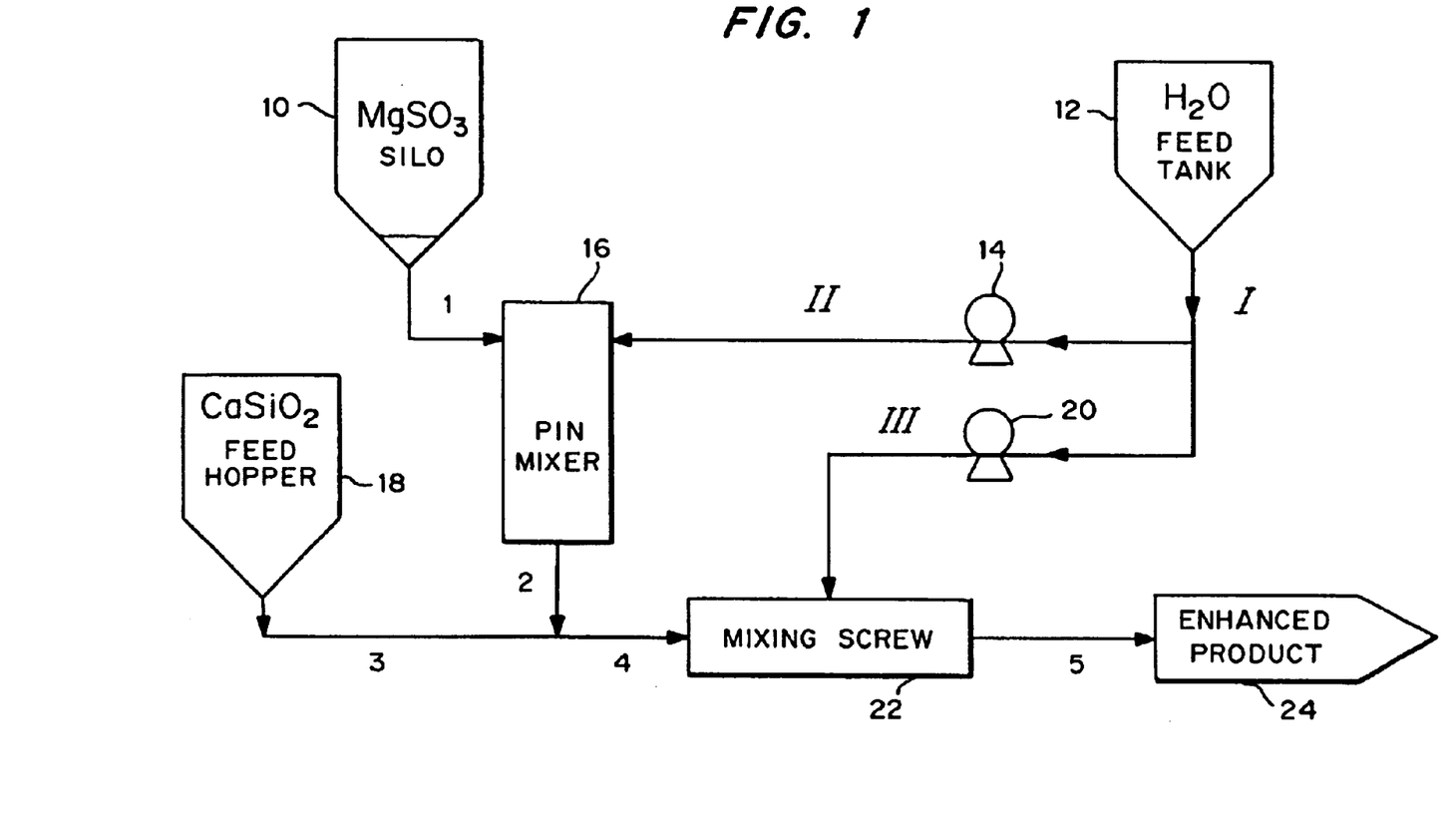
FIG. 1 is a process flow diagram depicting a method of making bulk magnesium-enhanced calcium silicate.
Figure 2:
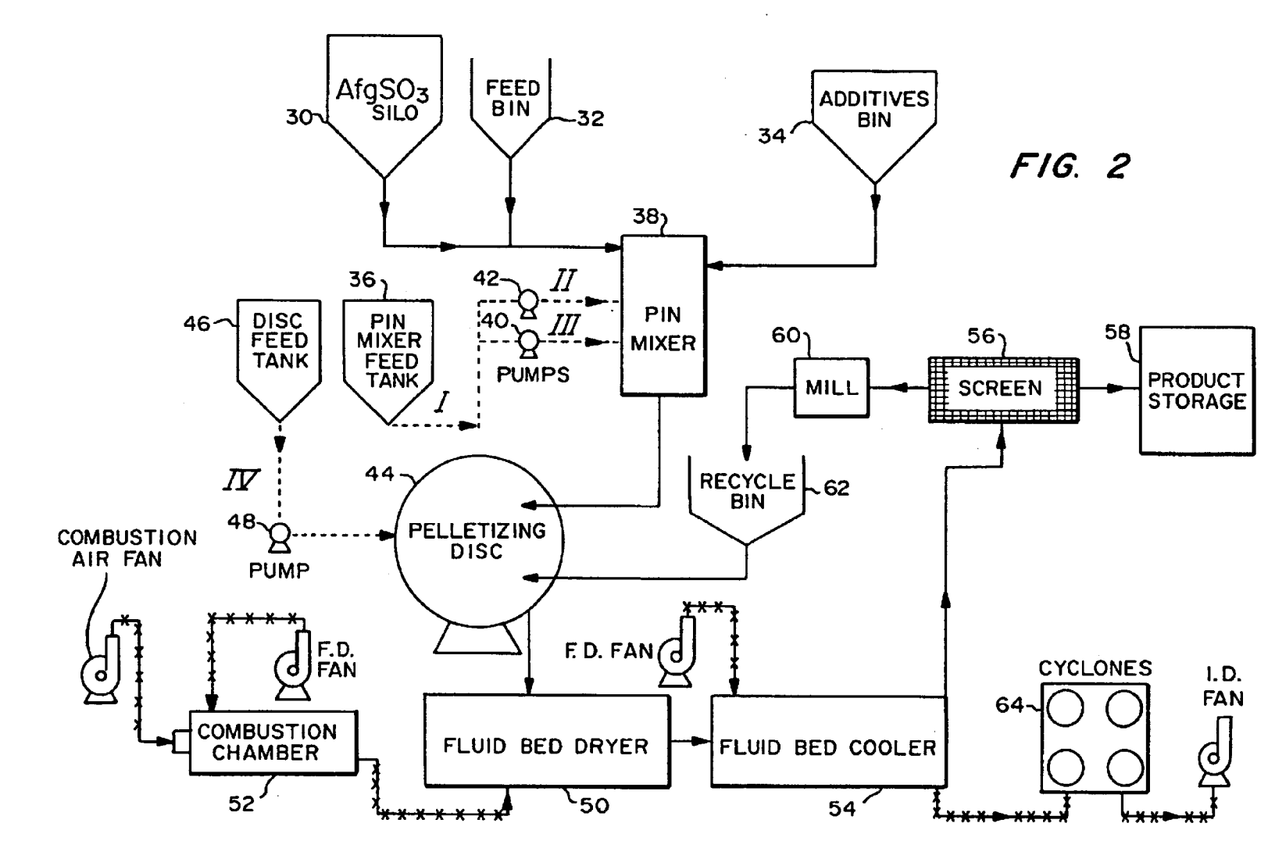
FIG. 2 is a process flow diagram of a method of making granulated magnesium-enhanced calcium silicate.

The compositions are formed by mixing CS slag with $MgSO_3$ and water. In the non-granulated Mg CS; the mass ratio of the starting materials, CS slag to Mg $SO_3$ to water, is approximately 20:4:1. In the granulated Mg CS, the mass ratio of the starting materials, CS slag to Mg $SO_3$ to water, is approximately 23:7:4. If additives, such as expandable clay are added, the starting materials are added in a mass ratio of 23:7:4:1 (CS slag to $MgSO_3$ to water to additives). Optionally, the water contains a surfactant, such as an anionic surfactants, which helps reduce the volume of water needed to for the formation of the granules. This also reduces the amount of drying time for the particles. After mixing the materials together, they are pelletized and then dried. To ensure that the granules are within the desired size range, they can be separated using a screen. Waste can be reduced by recycling the particles that are too large or too small for the finished product. FIGS. 1 and 2 are process flow diagrams which more clearly describe the methods for making non-granulated and granulated Mg CS.

a. Non-Granulated Mg CS

FIG. 1 is a process flow diagram which depicts a process for making non-granulated magnesium-enhanced calcium silicate. Magnesium sulfite by-product (10) is mixed with water (12), which is pumped (14) to the pin mixer (16), to hydrate the material. The size of the mixer and the flowrate of the materials determine the amount of mixing time. Typically, the magnesium sulfite by-product is mixed with the water for 10–60 seconds. Then mixture exits the pin mixer and is mixed with calcium silicate slag (18) and water (12), which is pumped (20) into the mixing screw (22). Typically this mixture is mixed in the mixing screw (22) for 30 seconds to 2 minutes. Then the magnesium-enhanced calcium silicate product (24) exits the mixing screw (22).

b. Granulated Mg CS

FIG. 2 is a process flow diagram for making pelletized magnesium-enhanced calcium silicate. Magnesium sulfite by-product (30), calcium silicate slag (32), expandable clay (34), and water (36) are mixed in a pin mixer (38). The water flows out of the pumps (40 and 42) and into the pin mixer (38). Mixing occurs for 10–60 seconds. While other types of mixers can be used, a pin mixer is preferred because it begins the agglomeration of the particles and decreases the amount of time that the disc pelletizer must run to form granules with the desired size. Then the mixture exits the pin mixer (38) and are transported to the disc pelletizer (44). Water (46) is also pumped (48) at a into the disc pelletizer (44) to wet the particles. Due to the rotating action of the disc pelletizer (44), the moistened material forms small particles with a size range of about 6 mesh to 40 mesh.

After the particles exit the disc pelletizer (44), they are dried in a fluid bed dryer (50). A combustion chamber (52)

sends a gas stream with a temperature of at least 550° F. and less than 600° F. to heat the fluid bed dryer (50). The granules are in the fluid bed dryer for about 2 to 8 minutes. A combination fluid bed dryer/fluid bed cooler, which is separated by a plate can be used. Alternatively, for large quantities of material, separate units are typically used. Air at ambient temperature and pressure is fed to the fluid bed cooler (54) and exits the fluid bed cooler (54) at a temperature of about 170–180° F. This gas stream contains the water vapor that was removed from the granules, therefore the exit temperature should not be less than the adiabatic saturation temperature.

To ensure that the particles are the proper size, when the particles exit the fluid bed cooler (54), they are sent to a screen (56). As noted above, particles for golf course application range from −12 mesh to 35 mesh, while for lawn or agricultural applications the particles are −6 mesh to 12 mesh. In the preferred embodiment a double screen is used. The first screen can remove the really large particles, allowing the second screen to more easily separate the particles with the desired size from the remain particles. For example, the first screen could be a 6 mesh screen and the second screen could be a 35 mesh. The particles with the desired size are sent to a product storage unit (58). The smaller and larger particles are recycled. They sent to a mill (60) and then to a recycle bin (62) to be pelletized again (44).

When the gas exists the fluid bed cooler, it is sent to cyclones (64), which remove any small particles from the gas stream. Optionally, like the recycled particles, these particles are can be recycled to reduce waste.

3. Applications for Magnesium-Enhanced Calcium Silicate

Magnesium-enhanced calcium silicate may be used as a soil enhancer for a variety of plants, including monocots, such as grasses, sugarcane, cucumbers, rice, oats, corn, wheat, and barley, and dicots, such as citrus plants, cucumbers and tomatoes. It can be applied in granulated and non-granulated forms.

When Mg CS is applied to the soil, it increases the amount of available silica in the soil. Silica is then absorbed by the plants and accumulates within the plant tissue. The plants become more rigid and upright and thereby become more stress resistant. The presence of silica in the plant also increases plant metabolism by increase leaf chlorophyll content, enhances plant tolerance to environmental stress factors, including cold, heat and drought, mitigated nutrient imbalance and metal toxicity in plants, and reinforces cell walls. Silica increases a plant's mechanical strength, which protects plants against pathogens and insects.

In addition to increasing the amounts of silica that are delivered to the plants, the administration of Mg CS to the soil increases the amount of magnesium which is delivered to the plants. The magnesium source, $MgSO_3$, is converted to $MgSO_4$, a more soluble form. During the transformation, Mg behaves as an antiseptic in the soil, and reduces the number of insects that attack the plant. Thus, Mg acts as a pest control for the plant.

In the preferred embodiment, magnesium-enhanced calcium silicate is applied to golf course greens. Typically, one ton per acre is applied to the golf course green every six months, such as in the spring and in the fall of each year. The grasses may be Bermuda grass or bent grass. Alternatively, commercial or residential lawns may be treated with Mg CS. All grasses benefit from treatment with Mg CS, including Saint Augustine and rye grasses, one ton per acre is applied to the golf course green every six months, such as in the spring and in the fall of each year. After the first year, Mg CS is reapplied based on the soil analysis.

In another embodiment, the magnesium-enhanced calcium silicate may be added to assist in the growth of new sugarcane or rice. The amount of magnesium-enhanced calcium silicate needed is based on the amount of soluble silica in the soil. For soils with high soluble silica contents, less Mg CS is necessary. For example, for soil samples with 0–3 mg soluble silica/liter, 4 tons Mg CS/acre is typically added. For samples with 3–10 mg of soluble silica/liter, 3 tons Mg CS/acre is added. For samples with 10–18 mg of soluble silica/liter, 2 tons Mg CS/acre it added. And for samples with 18–30 mg soluble silica/liter, 1 ton Mg CS/acre is added. The Mg CS is broadcast and incorporated into the soil prior to planting new sugarcane or ice. Magnesium-enhanced calcium silicate is not reapplied until the sugarcane plant is harvested and a new crop of sugarcane is planted. Thus, typically, Mg CS is reapplied every four years for the sugarcane plants. For rice, Mg CS is reapplied as needed. Often sugarcane is grown on the fields after rice is harvested. In such cases, Mg CS does not need to be reapplied.

The present invention will be further understood by reference to the following non-limiting examples.

EXAMPLES

Example 1

Silica Leaching Tests

Four different calcium silicate slags were tested to determine which one released the most silica. The test used a standard leaching test procedure, through multiple washings of the test material with a leaching solution in a column.

The leaching solution contained 0.1 M tris-hydroxy-methyl-amino methane (THAM) buffer. The THAM buffer was formed by dissolving 12.1 g THAM in 800 mL deionized (DI) water and adjusting the pH of the solution to 7.0 by adding 1:1 hydrochloric acid. The volume of the solution was then adjusted to 1000 mL through the addition of DI water. 15–20 liters of the buffer solution was formed.

A column containing a 20 mL syringe body (J&H Berge Inc., So. Plainfield, N.J., catalog # 79-4215-12), with a length of 10.6 cm and an inner diameter of 1.84 cm, was used in the leaching procedure (see FIG. 3B). Glass wool strands were shaped into two balls. One was placed at the bottom of the column to prevent the solid test material from exiting through the opening of the column, while the other ball was placed at the top of the column, above the test material, to prevent solids from the test material from floating around in the column when the leaching solution was pumped through the column.

The solid test material was prepared as follows. 3 g of the dried solid test material was mixed with 5.0 g of medium density polyethylene (Aldrich, Cat. No. 33,211-9) to form a homogeneous solid mixture. The test materials were Calcium Silicate Corporation regular slag (CS regular slag), CS slag with magnesium silicate (Mg CS slag), and RecMix® regular slag. Vansil wollastonite ($CaSiO_3$), a source of calcium silicate that contains 20% elemental silicon, was used as a control. CS slag contains 29.6% calcium and 43.41% silicon dioxide ($SiO_2$).

Figure 3A:
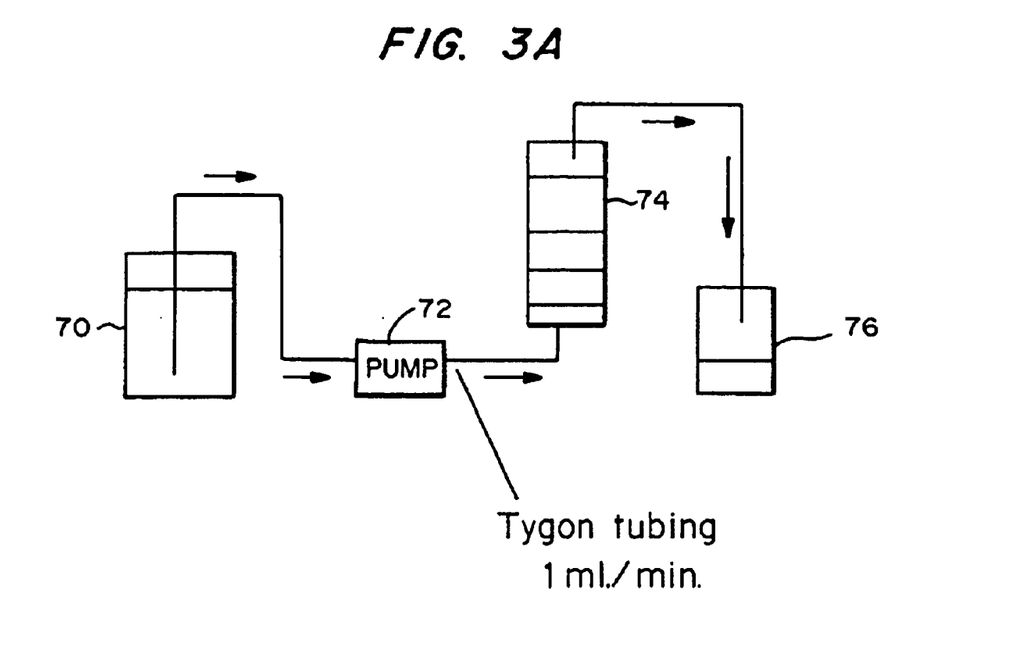
FIGS. 3A and 3B are schematics of the silica leaching test procedure.
Figure 3B:
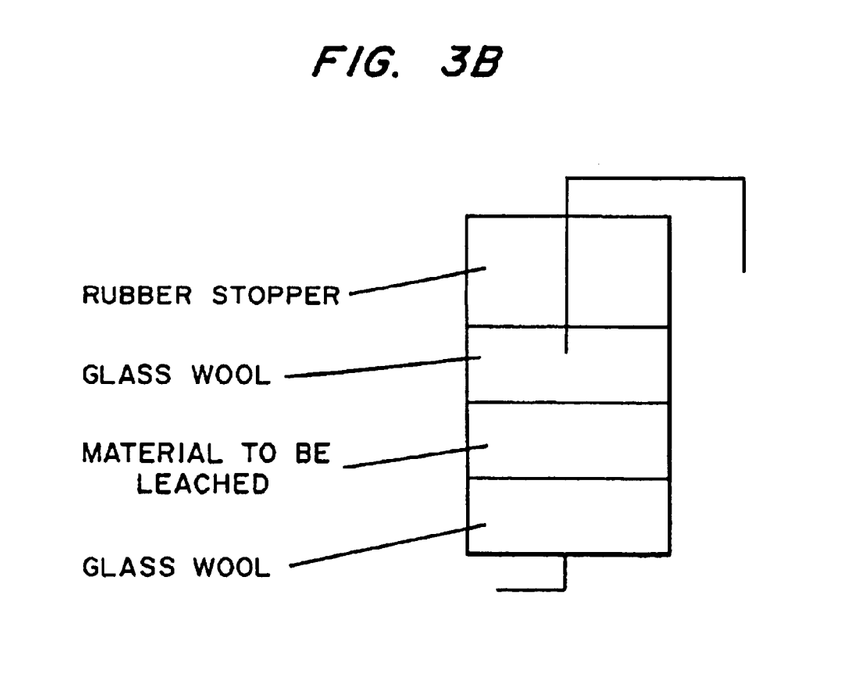

A schematic of the silica leaching procedure is depicted in FIG. 3A. The leaching solution buffer (70) is connect to a proportionating pump (72) (Bran & Luebbe, models II, III, and H) by Tygon tubing (rated 1.0 mL/min). The proportionating pump (72) connects with Tygon tubing (1 mL/min) which is attached to Tygon tubing (0.25" OD×0.125" ID), which is attached to the bottom of the column (74). The top of the column (74) is sealed with a rubber stopper which has a hole with Tygon tubing (0.25" OD×0.125" ID) fitted in the hole (see FIG. 3B for view of column). The tubing leads to a 2L polyethylene collection bottle (76).

Thus the leaching buffer solution was pumped through the bottom of the column, which it hydrolyzed the solid material and the leachate flowed out of the top of the column into a collection bottle. A portion of the sample was removed from the collection bottle and the amount of silica was determined.

Any standard method can be used to analyze the silica content, including e.g. 4500-Si-E (Standard Methods for Water and Wastewater, 19$^{th}$ Ed. 1995). Two leaching runs were performed for each solid test material and for the control. After 24 hours, the leachate was mixed thoroughly and a second sample of leachate was removed for silica analysis (Day 2).

The results of the leaching runs are listed in Table 1.

TABLE 1

Composition of Leached Materials

| Solid Test Material | Day 1 Silica (mg) | | Day 2 Silica (mg) | |
|---|---|---|---|---|
| Control | 48.1 | 47.2 | 40.3 | 39.4 |
| CS Regular Slag | 53.0 | 52.4 | 37.2 | 37.5 |
| Mg CS Slag | 67.8 | 65.4 | 46.8 | 43.7 |
| RecMix ® | 34.2 | 34.7 | 20.7 | 19.7 |

As demonstrated by the results listed in Table 1, Mg CS resulted in the largest amount of leached silica, on both days. The control, Vansil wollastonite, had a larger quantity of silica leach out of the sample than RecMix®. RecMix® resulted in the least amount of leached silica. These results demonstrate that Mg CS is capable of releasing large amounts of silica.

Example 2

Analysis of Silica Content in Different Slags

Four different slags were tested to determine their silica content. The slags were: CS slag with magnesium silicate (Mg CS), Calcium Silicate Corporation regular slag (CS regular slag), RecMix® regular slag, and Magnesium silicate clay. 2.0 g of slag were placed in a 50 mL tube. 25.0 mL of 0.5 N acetic acid was added to the tube. The tube was covered and shaken end over end for one hour. Then the contents of the tube were filtered through a Whatman #5 filter. 1.0 mL of the filtrate was removed and mixed with 10.0 ML of DI water. From this mixture, 0.5 mL was removed and mixed with 10.0 ML of DI water, 0.25 mL of hydrochloric acid (1:1 solution), and 0.5 mL of ammonium molybdate (10% adjusted). After mixing, the solution sat for 5 minutes. Then 0.5 mL tartaric acid (20% solution) was added. After mixing, the solution sat for 2 minutes. Then 0.5 mL sulfonic acid (reducing agent) was added. After mixing, the solution sat for 5 minutes. Then a sample was tested in the spectrophotometer with a 650 nm filter.

The results of the analysis are listed in Table 2.

TABLE 2

Silica Compositions of Different Slags

| Slag | Day 1 Silica | | Day 2 Silica | |
|---|---|---|---|---|
| | g | mg/l | g | mg/l |
| Mg CS | 2.0030 | 3.76 | 1.9986 | 1.59 |
| CS regular slag | 1.9995 | 3.08 | 1.9981 | 1.39 |
| RecMix ® | 2.0004 | 0.65 | 2.0004 | 0.65 |
| Mg silicate slag | 1.9974 | 0.07 | 2.0001 | 0.14 |

The results in Table 2 indicate that Mg CS and CS slag have similar amounts of silica. In contrast, the same weight of RecMix® has much less silica. A sample of Mg silicate slag with the same weight contained the least amount of silica.

Example 3

Effects of CS Slag, Mg CS Slag and Dolomite on Sugarcane

CS slag with magnesium sulfite (Mg CS slag), Calcium Silicate Corporation regular slag (CS regular slag), and Dolomite were applied in different amounts to a field of sugarcane and tested to determine the amounts of magnesium, calcium, and silicon that they delivered in the leaves after 27 weeks.

Mg CS slag contained 609 lb/ton $SiO_2$, 95 lb/ton Mg and 416 lb/ton Ca. CS regular slag contained 847 lb/ton $SiO_2$, 4 lb/ton Mg and 585 lb/ton Ca. Dolomite contained 170 lb/ton Mg and 453 lb/ton Ca and no silica.

The soil was tested to determine its pH and the amount of silicon, magnesium, and calcium in the soil prior to treatment. The soil was acidic, with a pH of 3.8. It contained 121 ppm Ca, 5.25 ppm Mg, and 1.25 lb/acre Si.

Fourteen plots were tested, including two control plots. Broadcast soil treatments were applied to Plots 1–5 and 8–13. Plots 7 and 14 served as controls and were not treated.

On Plot 1, 1 ton/acre of CS slag was applied to the soil. On Plot 2, 2 tons/acre of CS regular slag was applied to the soil. On Plot 3, 3 tons/acre of CS regular slag was applied to the soil. On the Plot 4, 1.12 tons/acre of CS magnesium-enhanced slag was applied to the soil. On Plot 5, 2.24 tons/acre of CS magnesium-enhanced slag was applied to the soil. On Plot 6, 3.36 tons/acre of CS magnesium-enhanced slag was applied to the soil.

On Plot 8, 2 tons/acre of Dolomite was applied to the soil. On Plot 9, 4 tons/acre of Dolomite was applied to the soil. On Plot 10, 6 tons/acre acre of Dolomite was applied to the soil.

On Plot 11, 6 tons/acre acre of Dolomite and 1 ton/acre CS regular slag were applied to the soil. On Plot 12, 6 tons/acre acre of Dolomite and 2 ton/acre CS slag were applied to the soil. On Plot 13, 6 tons/acre acre of Dolomite and 3 tons/acre CS regular slag were applied to the soil.

The broadcast treatments were applied over a three day period. One week later, sugarcane (CP78–1628) was planted mechanically on all of the plots. The plants were sampled and their leaves were tested 27 weeks after treatment to determine the weight percent of Mg, Ca and Si in the leaves. The results of the tests are listed in Table 3.

TABLE 3

Comparison Of Different Soil Enhancers Sugarcane Leaf Analysis

| Plot Number | % Mg | % Ca | % Si |
|---|---|---|---|
| 1 | 0.24 | 0.53 | 1.98 |
| 2 | 0.18 | 0.68 | 2.54 |
| 3 | 0.18 | 0.70 | 2.91 |
| 4 | 0.31 | 0.49 | 1.93 |
| 5 | 0.41 | 0.53 | 2.14 |
| 6 | 0.37 | 0.55 | 2.60 |
| 7 | 0.23 | 0.49 | 0.96 |
| 8 | 0.43 | 0.67 | 0.86 |
| 9 | 0.38 | 0.54 | 2.43 |
| 10 | 0.43 | 0.59 | 1.98 |
| 11 | 0.46 | 0.75 | 1.45 |
| 12 | 0.46 | 0.94 | 2.82 |
| 13 | 0.38 | 0.81 | 1.32 |
| 14 | 0.27 | 0.62 | 0.60 |

The plants from plots treated with Dolomite developed leaves with a similar content of Mg (0.38–0.43% (wt)) to those grown in plots that were treated with Mg CS slag (0.31–0.41% (wt)). The results are similar in spite of the fact that the Mg CS plots received less Mg than the plots treated with Dolomite. In contrast, the plots treated with CS regular slag developed leaves with less Mg (0.18–0.24% (wt)). This result corresponds with the amount of Mg found in the leaves of the plants grown in the control plots (0.23–0.27% (wt)). The plants which received a mixture of Dolomite and CS regular slag (Plots 11–13) produced plants with amounts of Mg in their leaves (0.38–0.46% (wt)) that correspond with the amounts found in the plants treated with Dolomite alone (Plots 8–10).

The plants which were treated with Dolomite (plots 8–10) and CS regular slag (plots 1–3) produced plants with similar amounts of Ca in their leaves. However, the plots which received 2 and 3 tons/acre of CS regular slag yielded plants with higher amounts of Ca (0.68 and 0.70% (wt), respectively). Plot 8, which was treated with 2 tons/acre of Dolomite, yielded plants with a similar amount of Ca (0.67% (wt)). Plots treated with a combination of Dolomite and CS regular slag produced plants with the greatest amount of Ca, ranging from 0.75% (wt) to 0.94% (wt). The plots treated with Mg CS slag produced plants with levels of Ca that were similar to those produced in the control plot 7. However, control plot 14 yielded plants with a Ca amount (0.62% (wt)) that was only slightly lower than the levels found in the CS regular slag and Dolomite-treated plants.

The silica levels in the plants treated with CS regular slag and those treated with Mg CS slag were similar. The plot treated with the mixture of 6 tons/acre Dolomite and 3 tons/acre CS regular slag produced plants with the greatest amount of silica (2.82% (wt)). However, the plot treated with 3.36 tons/acre of Mg CS slag alone produced plants with 2.60% Si in its leaves.

Though the data varies, some trends appear. Mg CS slag and CS regular slag produce plants with similar amounts of Ca and Si. Mg CS slag produces plants with greater amounts of Mg than plants treated with CS regular slag; and Mg CS slag and Dolomite produce plants with similar amounts of Mg.

Example 4

Effects of CS Regular and Mg CS Slags on Sugarcane

This slag field trial compared two different slag materials, Calcium Silicate Corporation regular slag from Tennessee (CS regular slag) and Mg CS slag at different rates on sugarcane (CP78-1628). CS regular slag contained 847 lb $SiO_2$/ton of material, 396 lb Si/ton of material, 4 lb Mg/ton of material, and 585 lbs Ca/ton of material. Mg CS slag contained 609 lb $SiO_2$/ton of material, 285 lb Si/ton of material, 95 lb Mg/ton of material, and 416 lbs Ca/ton of material.

The experiment was set up as a Randomized Complete Block Design with 4 replications on sandy soil. Each plot was 25 feet wide and 30 feet long. The different treatments were broadcast to each plot. The treatments were: 1 Ton/Acre CS regular slag, 2 Tons/Acre CS regular slag, 3 Tons/Acre CS regular slag, 1.12 Tons/Acre Mg CS slag, 2.24 Tons/Acre Mg CS slag, 3.36 Tons/Acre Mg CS slag, and no treatment (control). The plot numbers and their corresponding treatments are listed in Table 4.

TABLE 4

Plot Treatments

| Plot Number | Treatment |
|---|---|
| 1 | 1 Ton/Acre CS regular slag |
| 2 | 2 Tons/Acre CS regular slag |
| 3 | 3 Tons/Acre CS regular slag |
| 4 | 1.12 Tons/Acre Mg CS slag |
| 5 | 2.24 Tons/Acre Mg CS slag |
| 6 | 3.36 Tons/Acre Mg CS slag |
| 7 | Control |

During the trial, soil and leaf samples were obtained and tested for pH and amounts of Ca, Mg, Si, and S. Four samples were taken from each plot at a time. Statistical analysis of the data obtained during the trial was analyzed using Duncan's Analysis of Variance (ANOVA) and Multiple Range Test with a 0.05 significance level. Data in Tables 5–13 correspond with the means of the four samples that were tested. The letters at the side of Tables 6–13 indicate ranges of significant difference. Each letter signifies a different range of values. Since some of the ranges overlap, treatment means sometimes have a few letters next to them. For each Table, treatment means followed by the same letter are not significantly different (e.g. for Table 6 for the pH determined at week 27, each Plot followed by "A" did not have a pH that is statistically significant for the other Plots followed by "A").

Soil pH

The soil initially contained a very low pH, about 3.8, and very little soluble silicon. Ca and Mg levels were low as well. The desired pH level for sugarcane on flatwoods sand is 6.5 and the University of Florida recommendation for silicon is 30 lb/ac. Thus, low soil pH and silicon levels provide an appropriate environment for testing the effect of each slag on the delivery of nutrients to the sugarcane plants, the soil pH and nutrient levels in the soil. Table 5 lists the pH and the amounts of Ca, Mg and silicon that were present in the soil prior to application of the slag materials.

TABLE 5

Pre-Treatment Soil Analysis

| Plot Number | pH | Ca (ppm) | Mg (ppm) | Silicon (lb/ac) |
|---|---|---|---|---|
| 1 | 3.79 | 89 | 4.50 | 1.00 |
| 2 | 3.73 | 103 | 4.50 | 1.00 |
| 3 | 3.75 | 86 | 4.33 | 1.0 |

TABLE 5-continued

Pre-Treatment Soil Analysis

| Plot Number | pH | Ca (ppm) | Mg (ppm) | Silicon (lb/ac) |
|---|---|---|---|---|
| 4 | 3.74 | 96 | 6.00 | 1.25 |
| 5 | 3.76 | 85 | 6.00 | 1.00 |
| 6 | 3.75 | 110 | 4.75 | 1.25 |
| 7 | 3.79 | 121 | 5.25 | 1.25 |

Soil pH

Soil pH was monitored for seven months. Soil samples were taken and tested at 5 weeks, 14 weeks, 18 weeks, and 27 weeks after treatment. Table 6 lists the mean pH for each plot for each time period.

TABLE 6

Effect Of Soil Treatment on pH Over Time

| Plot Number | Before Treatment | 5 weeks | 14 weeks | 18 weeks | 27 weeks | Significant Difference at 27 weeks |
|---|---|---|---|---|---|---|
| 1 | 3.79 | 4.21 | 4.11 | 4.18 | 3.98 | B C |
| 2 | 3.73 | 4.40 | 4.42 | 4.44 | 4.14 | A B C |
| 3 | 3.75 | 4.35 | 4.59 | 4.59 | 4.40 | A |
| 4 | 3.74 | 4.06 | 4.15 | 4.11 | 3.84 | C |
| 5 | 3.76 | 4.25 | 4.36 | 4.36 | 4.06 | B C |
| 6 | 3.75 | 4.31 | 4.63 | 4.55 | 4.27 | A B |
| 7 | 3.79 | 4.15 | 4.15 | 4.02 | 3.89 | C |

Initial soil pH levels were not significantly different (ranging from 3.73–3.79), and all plots started with pHs at or below the control pH (3.79). Both slag materials increased the soil pH over the first 4 months of the trial. However, at 27 weeks, only plots 3 and 6, which contain 3 tons/acre of CS regular slag and 3.36 tons/acre of Mg CS slag, respectively, were significantly higher than the pH of the soil prior to treatment. However, none of the samples increased the soil pH to 6.5, the recommended pH for growing sugarcane.

Soil and Leaf Silica Levels

The amount of silicon in the soil was tested prior to planting and 27 weeks after treatment. Table 7 lists the mean amount of silicon (lb/acre) for each plot for each time period.

TABLE 7

Soil Silicon Levels After Treatment

| Plot Number | Before Treatment | 27 weeks | Significant Difference at 27 weeks |
|---|---|---|---|
| 1 | 1.00 | 5.50 | D E |
| 2 | 1.00 | 23.50 | C |
| 3 | 1.00 | 45.75 | A |
| 4 | 1.25 | 12.25 | C D E |
| 5 | 1.00 | 20.25 | C D |
| 6 | 1.25 | 27.50 | B C |
| 7 | 1.25 | 2.25 | E |

Soil silicon levels showed a significant increase in plot 3 (45.75 lb/acre), which was treated with 3 ton/acres CS slag. The second highest increase occurred in plot 6 (27.50 lb/acre), which was treated with 3.36 tons/acre Mg CS slag, which was also significantly higher than the results obtained in other plots.

Leaf silicon levels were tested at 27 weeks after treatment. Table 8 lists the mean amount of silicon in the leaf (% wt) for each plot at 27 weeks after treatment.

TABLE 8

Silicon Leaf Levels After Treatment

| Plot Number | Leaf silicon % (wt) 27 weeks | Significant Difference at 27 weeks |
|---|---|---|
| 1 | 1.13 | A B C D |
| 2 | 1.49 | A B C |
| 3 | 1.72 | A |
| 4 | 1.21 | A B C D |
| 5 | 1.53 | A B C |
| 6 | 1.69 | A |
| 7 | 0.88 | C D |

The % (wt) silicon in the leaves was greatest for plots 3 and 6, which received the greatest quantities of slag material. However, both slags yielded similar results and resulted in a greater amount of silicon in the sugarcane leaves (ranging from 1.13% to 1.72%) than the control (0.88%). Further, due to the variation within the data, none of the differences between the data for the different plots were significant.

A comparison of Tables 5 and 6 demonstrates that the % (wt) silicon in the leaf corresponds with the amount of silicon in the soil. Plots with higher quantities of silicon in the soil yielded sugarcane plants with greater amounts of silicon in the leaves.

Soil and Leaf Magnesium Levels

Soil Mg was tested prior to planting and 27 weeks after treatment. Table 9 lists the mean amount of Mg (ppm) for each plot for each time period.

TABLE 9

Soil Mg Levels After Treatment

| Plot Number | Before Treatment | 27 weeks | Significant Difference at 27 weeks |
|---|---|---|---|
| 1 | 4.50 | 14.00 | B C |
| 2 | 4.50 | 6.50 | C |
| 3 | 4.33 | 8.00 | C |
| 4 | 6.00 | 16.75 | B C |
| 5 | 6.00 | 35.50 | A B |
| 6 | 4.75 | 49.25 | A |
| 7 | 5.25 | 12.25 | B C |

Soil Mg (ppm) showed the most significant increase for plot 6, which was treated with 3.36 tons/acre Mg CS slag. Plots 4 and 5, which received smaller amounts of Mg CS slag, also had greater amounts of Mg than all the CS regular slag treatments and the control. In contrast, plots 2 and 3 contained lower amounts of Mg in the soil than the control.

Leaf Mg levels were tested 27 weeks after treatment. Table 10 lists the mean amount of Mg in the leaf (% wt) for each plot at 27 weeks after treatment.

TABLE 10

Mg Levels in Leaves After Treatment

| Plot Number | Leaf Mg % (wt) 27 weeks | Significant Difference at 27 weeks | | |
| --- | --- | --- | --- | --- |
| 1 | 0.225 |   | C | D | E |
| 2 | 0.180 |   |   |   | E |
| 3 | 0.198 |   |   | D | E |
| 4 | 0.330 |   | B |   |   |
| 5 | 0.368 | A | B |   |   |
| 6 | 0.383 | A |   |   |   |
| 7 | 0.238 |   |   | C | D |

All of the Mg CS slag treatments were significantly higher than the control and the CS regular slag treatments for leaf % Mg. In contrast, all of the plots which received the CS regular slag treatments produced plants with less Mg than the control plants. For example, plot 2 was significantly lower than the control. This trend correlates with the amounts of Mg in the soil (see Table 7). Normal level for Mg in the leaves is 0.15–0.35% (wt).

Soil and Leaf Calcium Levels

Soil Ca was tested prior to planting and 27 weeks after treatment. Table 8 lists an amount of Ca (ppm) for each plot for each time period and amount by which the Ca (ppm) increased.

TABLE 11

Soil Calcium Levels After Treatment

| Plot Number | Soil Ca (ppm) | | | Significant Difference at 27 weeks | |
| --- | --- | --- | --- | --- | --- |
|  | Before Treatment | 27 weeks | Increase | | |
| 1 | 89 | 206 | 117 | D | E |
| 2 | 103 | 220 | 117 | D | E |
| 3 | 86 | 279 | 193 | D | E |
| 4 | 96 | 176 | 80 |   | E |
| 5 | 85 | 238 | 153 | D | E |
| 6 | 110 | 318 | 208 | D |   |
| 7 | 121 | 175 | 54 |   | E |

Plot 6 demonstrated the most significant increase in the amount of Ca in the soil. However, all of the plots treated with a slag showed greater increases in the amount of Ca in the soil than the control.

Leaf Ca levels were tested 27 weeks after treatment. Table 12 lists the mean amount of Ca in the leaf (% wt) for each plot at 27 weeks after treatment.

TABLE 12

Calcium Levels in Leaves After Treatment

| Plot Number | Leaf Ca % (wt) 27 weeks | Significant Difference at 27 weeks | | |
| --- | --- | --- | --- | --- |
| 1 | 0.513 | A | B | C |
| 2 | 0.548 | A | B | C |
| 3 | 0.610 | A |   |   |
| 4 | 0.453 |   | B | C |
| 5 | 0.443 |   |   | C |
| 6 | 0.508 | A | B | C |
| 7 | 0.478 |   | B | C |

Plots which were treated with CS regular slag produced plants with a greater amount of Ca in their leaves (0.513–0.610%) than plots which were treated with Mg CS slag (0.443–0.508%). The Mg in the Mg CS-treated plots competes with the Ca for delivery to the plant. In contrast, the CS regular slag-treated plots did not have much Mg, thus more Ca was able to reach the plant. However, the plants treated with Mg CS received sufficient quantities of Ca. Normal range for calcium is 0.2–0.45% (wt). Due to the variation in the data, the differences are not significant.

Leaf Sulfur Levels

Leaf sulfur levels were tested 27 weeks after treatment. Table 13 lists the mean amount of sulfur in the leaf (% wt) for each plot at 27 weeks after treatment.

TABLE 13

Leaf Sulfur Levels After Treatment

| Plot Number | Leaf S % (wt) 27 weeks | Significant Difference at 27 weeks | | |
| --- | --- | --- | --- | --- |
| 1 | 0.283 |   | B | C |
| 2 | 0.275 |   |   | C |
| 3 | 0.280 |   | B | C |
| 4 | 0.315 | A | B |   |
| 5 | 0.323 | A |   |   |
| 6 | 0.315 | A | B |   |
| 7 | 0.285 |   | B | C |

The data in Table 13 demonstrate that significantly greater amounts of sulfur were found in the plants which were grown in plots treated with Mg CS slag. The plots treated with CS regular slag produced plants with basically the same amount of sulfur in their leaves as the plants grown in the control plot.

It is understood that the disclosed invention is not limited to the particular methodology, protocols, and reagents described as these may vary. It is also to be understood that the terminology used herein is for the purpose of describing particular embodiments only, and is not intended to limit the scope of the present invention which will be limited only by the appended claims.

Those skilled in the art will recognize, or be able to ascertain using no more than routine experimentation, many equivalents to the specific embodiments of the invention described herein. Such equivalents are intended to be encompassed by the following claims.

What is claimed is:

1. A silicon and magnesium plant absorption enhancing composition, comprising a mixture of calcium silicate slag particles, magnesium sulfite particles, and water, wherein the calcium silicate slag particles, the magnesium sulfite particles and water are in a mass ratio of approximately 20:4:1 for non-granulated MgCS and approximately 2:7:4 for granulated MgCS.

2. The composition of claim 1, wherein the calcium silicate slag is a by-product from phosphorus plants.

3. The composition of claim 1, wherein the magnesium sulfite is a by-product from power plants.

4. The composition of claim 1 in a form selected from the group consisting of non-granular and granular forms.

5. The composition of claim 1, wherein the calcium silicate slag comprises about 75–90% (wt) and magnesium sulfite comprises about 10–20% (wt).

6. The composition of claim 5, further comprising about 0–10% (wt) water.

7. The composition of claim 5, wherein the form is non-granular.

8. The composition of claim 1, wherein the calcium silicate slag comprises about 65–90% (wt) and magnesium sulfite comprises about 20–30% (wt).

9. The composition of claim 8, further comprising about 2–10% (wt) water.

10. The composition of claim 8, wherein the form is granular.

11. The composition of claim 9, further comprising about 0–5% (wt) expandible clay.

12. A method for enhancing plant absorption of silicon and magnesium, comprising applying the composition of claim 1 to soil.

13. The method of claim 12, wherein the soil is used in applications selected from the group consisting of golf courses, agricultural applications, and lawns.

* * * * *